United States Patent
Gebhard et al.

[11] Patent Number: 6,074,083
[45] Date of Patent: Jun. 13, 2000

[54] HYDROSTATIC-MECHANICAL DRIVE FOR A MIXING DRUM

[75] Inventors: Wolfgang Gebhard; Egon Mann, both of Friedrichshafen, Germany

[73] Assignee: ZF Friedrichshafen AG, Friedrichshafen, Germany

[21] Appl. No.: 09/125,160

[22] PCT Filed: Mar. 21, 1997

[86] PCT No.: PCT/EP97/01432

§ 371 Date: Aug. 13, 1998

§ 102(e) Date: Aug. 13, 1998

[87] PCT Pub. No.: WO97/36723

PCT Pub. Date: Oct. 9, 1997

[30] Foreign Application Priority Data

Mar. 30, 1996 [DE] Germany .................. 196 12 873

[51] Int. Cl.[7] .................................................. B28C 5/18
[52] U.S. Cl. ...................................... 366/61; 60/464
[58] Field of Search .............................. 366/60, 61, 62, 366/63, 59; 60/468, 464, 456, 461

[56] References Cited

U.S. PATENT DOCUMENTS

| 4,329,064 | 5/1982 | Mann et al. | 366/62 |
| 4,542,990 | 9/1985 | Fouquet | 366/61 |
| 5,419,132 | 5/1995 | Sato et al. | 60/468 |
| 5,746,509 | 5/1998 | Gebhard et al. | 366/61 |

FOREIGN PATENT DOCUMENTS

| 0 056 865 A1 | 8/1982 | European Pat. Off. . | |
| 0 102 266 A2 | 3/1984 | European Pat. Off. . | |
| 0 603 421 A1 | 6/1994 | European Pat. Off. . | |
| 20 50 944 | 4/1971 | Germany . | |
| 27 20 710 | 11/1978 | Germany . | |
| 43 13 025 A1 | 10/1994 | Germany . | |
| 59-106333 | 6/1984 | Japan | 366/61 |
| 936 493 | 9/1963 | United Kingdom | 366/61 |
| 936493 | 9/1963 | United Kingdom . | |
| WO 94/23918 | 10/1994 | WIPO . | |

OTHER PUBLICATIONS

Japanese Abstract, (Daikin Ind Ltd) vol. 014, No. 536 (M–1052) dated Nov. 27, 1990.

*Primary Examiner*—Tony G. Soohoo
*Attorney, Agent, or Firm*—Davis and Bujold

[57] ABSTRACT

A hydrostatic-mechanical drive unit for a mixing drum, especially of a mobile concrete mixer has pistons (24) of a hydraulic motor (25) that are spring-loaded so as to constantly bear, via rollers (25), on a cam surface (26). With a hydraulic pump (2) stationary, the operating mode of the hydraulic motor (6) can be reversed. In order to reliably prevent further oscillation of the mixing drum, suction valves (32, 33) are connected to lines (4, 5) leading to the hydraulic motor (6) so that when the mode principle of the hydraulic motor (6) is reversed, oil can be inducted from an oil reservoir.

11 Claims, 2 Drawing Sheets

HYDROSTATIC-MECHANICAL DRIVE FOR A MIXING DRUM

BACKGROUND OF THE INVENTION

The invention relates to a hydrostatic-mechanical drive unit for a mixing drum, especially of a mobile concrete mixer. The drive unit has a hydraulic pump connected to a hydraulic motor via lines. The hydraulic pump is surrounded by a housing. A transmission housing accommodates the hydraulic motor and a planetary transmission. A component of the planetary transmission is in driving connection with an input flange of the mixing drum.

A hydrostatic-mechanical drive unit of the configuration explained above has been disclosed in DE-A 43 13 025. To improve the cooling of the unit, oil is steadily fed from a high-pressure circuit to the drive unit. Also, cooled oil is steadily fed to the interior of the transmission housing in such a manner that cooling of the hydraulic motor also results. The hydraulic motor is preferably a slowly working radial-piston motor. The pistons of the radial-piston motor bear, via rollers, on a cam surface which has a course substantially shaped as a sine wave. Each piston is biased into the cylinder block under the action of a spring component. The spring components can be formed, for example, of compression springs. They produce a constant, positive connection between the rollers of the pistons and the cam surface. It is thus ensured that the piston spaces always remain filled with oil. This arrangement reduces the further oscillation of the concrete mixer drum when an internal combustion engine is shut down.

This invention is based on the problem of further improving the arrangement for preventing further oscillation of the mixing drum without too much extra construction cost.

SUMMARY OF THE INVENTION

This problem is solved with a hydrostatic-mechanical drive unit according to the preamble of the main claim and also the characteristic features.

BRIEF DESCRIPTION OF THE DRAWING(S)

Other features essential to the invention and the advantages resulting therefrom are to be understood from the description that follows of one embodiment of the invention, and the drawings, in which:

FIG. 1 is a hydraulic diagram of a hydrostatic-mechanical mixing drive unit; and FIG. 2 is a simplified section of a slowly working radial-piston hydromotor having one suction valve.

DESCRIPTION OF THE PREFERRED EMBODIMENT(S)

Figure 1:
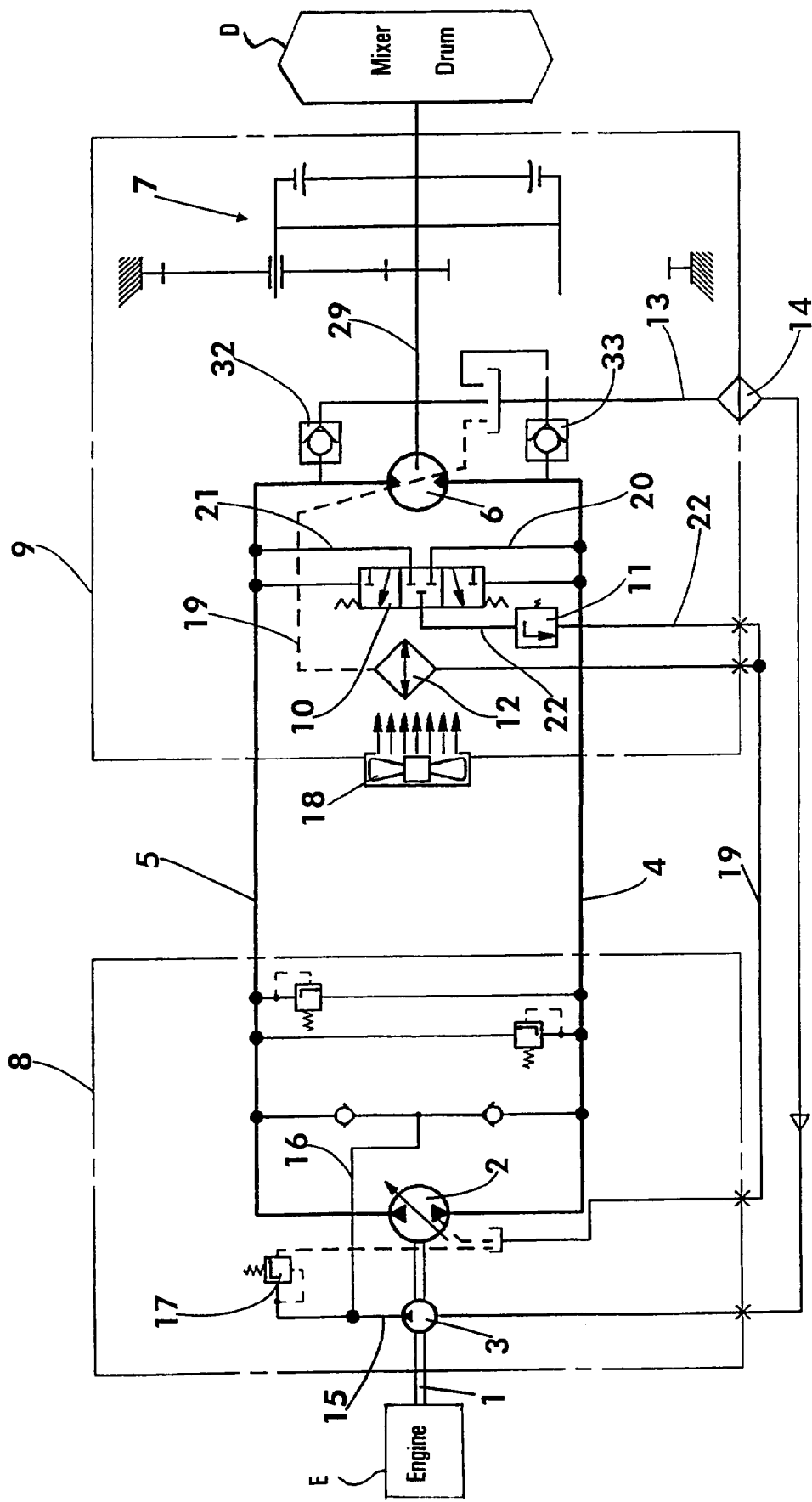

In FIG. 1 a hydraulic pump 2 is driven by a shaft 1 attached to an internal combustion engine, designated as E. The hydraulic pump 2 is designed as an adjusting unit with reversible directions of rotation. A feed pump 3 is also driven by the shaft 1.

The hydraulic pump is connected with a hydraulic motor 6 by lines 4 and 5. The hydraulic motor 6 drives a concrete mixer drum, designated as D via a downstream planetary transmission 7.

The hydraulic pump 2 is surrounded by a housing 8. A transmission housing 9 surrounds the hydraulic motor 6, the planetary transmission 7, a flush slide 10 and a flush valve 11.

An oil cooler 12 is also located on or in the transmission housing 9.

A line 13 leads to a filter 14 and from there to the feed pump 3. The feed pump 3 sucks oil from the interior of the transmission housing 9, via the line 13 and the filter 14, and conveys it, via a line 15 from which a line 16 branches off, to the respective low-pressure circuit. A pressure-limiting valve 17 is attached to the line 15 or 16.

The oil cooler 12 is loaded with cool air generated by a fan 18.

The pump housing 8 is connected with the oil cooler 12 by a line 19. The section of the line 19 lying after the oil cooler 12, which section is shown in the drawing with dotted lines, discharges in the immediate proximity of the hydraulic motor 6 so that the latter is constantly surrounded with a flow of cooled oil, the accumulating, heated, leakage oil being eliminated by mixing in the interior of the transmission housing.

Lines 20, 21 lead from the lines 4 and 5 to the flush slide 10. Depending on the switching position of the flush slide 10, oil flows steadily from one of the lines 4 or 5 to the line 22 where the flush valve 11 is located, and from there, together with the oil of the line 19, to the oil cooler 12.

Figure 2:
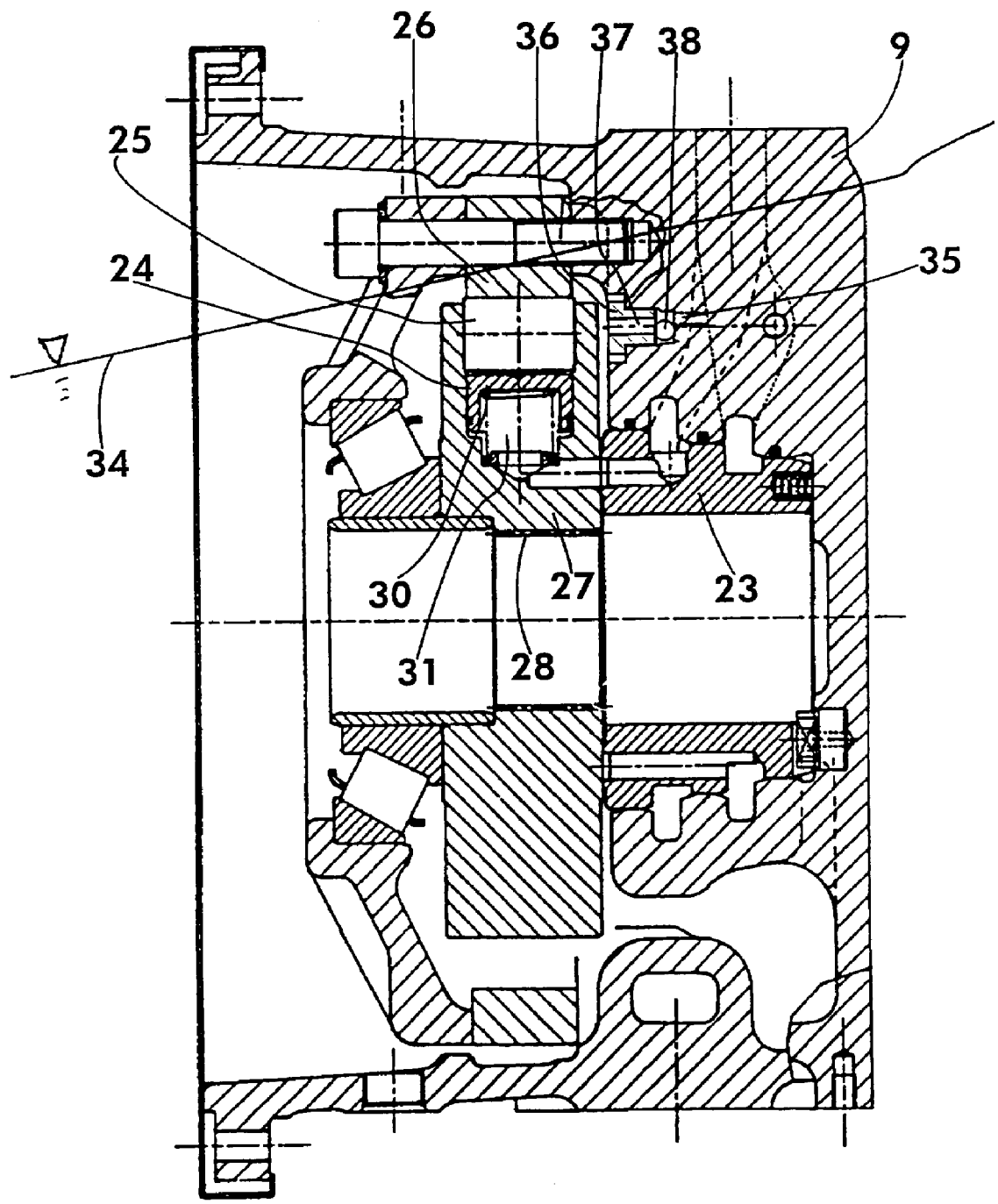

The oil conveyed by the hydraulic pump 2 reaches a cylinder block 27, via a distributor 23 (FIG. 2). The oil presses against the piston 24 whereby a roller 25 is moved along a cam surface 26 (CAM). Seen from the front, the cam surface 26 is substantially shaped as a sine wave. Only one of the pistons 24 of the hydraulic motor 6 can be seen in the drawing. The cylinder block 27 is rotated. The hydraulic motor 6 drives, via an involute spline 28, an input shaft 29 of the planetary transmission 7.

It is to be understood that each of the pistons 24 of the radial-piston motor is biased into the cylinder block 27 under the action of a spring component 30. The spring components 30 can be formed, for example, of compression springs. The spring components 30 produce a permanent positive connection between the rollers 25 of the pistons 24 and the cam surface 26. The function of the spring components 30 consists of ensuring that the interior spaces 31 formed by the cylinder block 27 and the pistons 24 (in which the spring components 30 are situated) are filled with oil. If the hydraulic pump 2 stops and a torque is introduced on the hydraulic motor 6, the operating principle or mode of the hydraulic motor reverses and it functions as a hydraulic pump. The cam surface 26 here presses the roller 25 of the piston 24 radially inwardly and produces in the interior space 31 a pressure which counteracts the acting torque. The piston 24, however, is inwardly pressed by oil leakage. The cylinder block 27 carries out a slow rotation motion. During said rotation motion, an adjacent piston 24 is radially pressed outwardly by the spring component 30 and again tries to fill the interior space 31 with oil.

To simplify the filling operation, suction valves 32 and 33 (see FIG. 1) are provided by which a radially outwardly moving piston 24 can suck oil directly from the interior space of the transmission housing 9. As can be seen from the drawing, the suction valves 32, 33 are designed as check valves. The check valves, in normal operation, that is, while the hydraulic pump 2 rotates, are closed by the system pressure prevalent in the lines 4 and 5. The suction valves ensure that the pistons 24 are always capable of sucking enough oil during stoppage of the hydraulic pump 2.

The suction valves 32 and 33 are installed in the transmission housing 9 below the oil level 34, as it appears in the installation position of the hydrostatic-mechanical drive unit. A suction valve is connected by a hole 35 with the respective high-pressure leading line 4 or 5. When pressure prevails in the lines 4 and 5, the suction valves 32 and 33 close in the direction of the interior space of the transmission housing 9 (tank) so that no oil can reach into the interior space (tank) from the closed circuit. If the hydraulic pump 2 stops and a vacuum is produced by the spring components 30 of the pistons 24, the suction valve 32 or 33 in whose line the vacuum occurs opens. Oil is then directly sucked from the interior of the transmission housing 9.

The suction valves 32, 33 consist of a threaded piece 36, the center of which has a through hole 37. A ball 38 closes or opens the through hole 37.

| Reference numerals | |
|---|---|
| 1 shaft | 20 line |
| 2 hydraulic pump | 21 line |
| 3 feed pump | 22 line |
| 4 line | 23 distributor |
| 5 line | 24 piston |
| 6 hydraulic motor | 25 roller |
| 7 planetary transmission | 26 cam surface |
| 8 pump housing | 27 cylinder block |
| 9 transmission housing | 28 involute spline |
| 10 flush slide | 29 input shaft |
| 11 flush valve | 30 spring component |
| 12 oil cooler | 31 interior space |
| 13 line | 32 suction valve |
| 14 filter | 33 suction valve |
| 15 line | 34 oil level |
| 16 line | 35 hole |
| 17 pressure-limiting valve | 36 threaded piece |
| | 37 through hole |
| 18 fan | 38 ball |
| 19 line | |

What is claimed is:

1. A hydrostatic-mechanical drive unit for driving a mobile concrete mixing drum comprising:

a hydraulic pump (2) being coupled to receive driving power from a drive input (1);

a hydraulic motor (6) for driving a mobile concrete mixing drum;

two hydraulic lines (4, 5) interconnecting the hydraulic pump (2) with the hydraulic motor (6) to supplying driving power from the hydraulic pump (2) to the hydraulic motor (6) for driving the mobile concrete mixing drum, and each one of the two hydraulic lines (4, 5) being connected, via a suction valve (32, 33), to an oil reservoir to facilitate supplying oil from the reservoir to each of the two hydraulic lines (4, 5) via one of the suction valves (32 or 33);

a feed pump (3) coupling each of two hydraulic lines (4, 5) to the reservoir to facilitate supplying oil from the reservoir to the two hydraulic lines (4, 5); and the hydraulic motor (6) having a cylinder block (27) containing at least one piston (24) therein, the at least one piston (24) being permanently biased toward a cam surface (26), via a spring (30), with a roller (25) being located between the at least one piston (24) and the cam surface (26,) whereby when operation of the hydraulic motor (6) and the feed pump (3) are discontinued, the hydraulic motor (6) is able to suck oil from the reservoir, via at least one of the suction valves (32 or 33), and function as an oil pump.

2. The hydrostatic-mechanical drive unit of claim 1, wherein the suction valves are check valves (32, 33) which are closed, when the hydraulic motor (6) is operated by the hydraulic pump (2), and open when the hydraulic motor (6) functions as an oil pump and sucks oil from the reservoir.

3. The hydrostatic-mechanical drive unit according to claim 2, wherein the check valves (32, 33) each comprise a one way ball valve that is operable by hydraulic pressure.

4. The hydrostatic-mechanical drive unit of claim 1, wherein the suction valves are situated in an interior of a transmission housing horizontally beneath an oil level of the hydrostatic-mechanical drive unit.

5. The hydrostatic-mechanical drive unit according to claim 1, wherein the cam surface is sinusoidal in shape.

6. A hydrostatic-mechanical drive unit comprising:

a reversible hydraulic pump being coupled to receive driving power from a drive input (1);

a hydraulic motor (6) for rotating a mobile concrete mixing drum;

two hydraulic lines (4, 5) interconnecting the hydraulic pump (2) with the hydraulic motor (6) to supplying driving power from the hydraulic pump (2) to the hydraulic motor (6) for driving the mobile concrete mixing drum, and each one of the two hydraulic lines (4, 5) being connected, via a suction valve (32, 33), to an oil reservoir to facilitate supplying oil from the reservoir to each of the two hydraulic lines (4, 5) via one of the suction valves (32 or 33);

a feed pump (3) coupling each of two hydraulic lines (4, 5) to the reservoir to facilitate supplying oil from the reservoir to the two hydraulic lines (4, 5); and the hydraulic motor (6) having a cylinder block (27) containing a plurality of pistons (24) therein, each one of the plurality of pistons (24) being permanently biased toward a cam surface (26), via a respective spring (30), and a respective roller (25) being located between each one of the plurality of pistons (24) and the cam surface (26) whereby when operation of both the hydraulic motor (6) and the feed pump (3) are discontinued, the hydraulic motor (6) is able to suck oil from the reservoir, via at least one of the suction valves (32 or 33), and function as an oil pump.

7. The hydrostatic-mechanical drive unit of claim 6, wherein the suction valves (32, 33) are check valves which are closed, when the hydraulic motor (6) is operated by the hydraulic pump (2), and open when the hydraulic motor (6) functions as the oil pump and sucks oil from the reservoir.

8. The hydrostatic-mechanical drive unit according to claim 7, wherein the check valves (32, 33) each comprise a one way ball valve that is operable by hydraulic pressure.

9. The hydrostatic-mechanical drive unit of claim 6, wherein the suction valves (32, 33) are situated in an interior of a transmission housing horizontally beneath an oil level of the hydrostatic-mechanical drive unit.

10. The hydrostatic-mechanical drive unit according to claim 6, wherein the cam surface is sinusoidal in shape.

11. A hydrostatic-mechanical drive unit for driving a mobile concrete mixing drum comprising:

a hydraulic pump (2) being coupled to receive driving power from a drive input (1);

a hydraulic motor (6) rotating a mobile concrete mixing drum;

two hydraulic lines (4, 5) interconnecting the hydraulic pump (2) with the hydraulic motor (6) to supplying driving power from the hydraulic pump (2) to the hydraulic motor (6) for driving the mobile concrete mixing drum, and each one of the two hydraulic lines (4, 5) being connected, via a suction valve (32, 33), to an oil reservoir to facilitate supplying oil from the reservoir to each of the two hydraulic lines (4, 5) via one of the suction valves (32 or 33); and the hydraulic motor (6) having a cylinder block (27) containing at least one piston (24) therein, the at least one piston (24) being permanently biased toward a cam surface (26), via a spring (30), with a roller (25) being located between the at least one piston (24) and the cam surface (26,) whereby when operation of the hydraulic motor (6) is discontinued, the hydraulic motor (6) is able to suck oil from the reservoir, via at least one of the suction valves (32 or 33), and function as an oil pump;

wherein the cam surface is sinusoidal in shape.

* * * * *